Jan. 9, 1940.  T. BRADFORD  2,186,517
APPARATUS AND METHOD FOR ASCERTAINING AND RECORDING
CONDITIONS OF THE CIRCULATORY SYSTEM
Filed Aug. 22, 1936  6 Sheets-Sheet 1
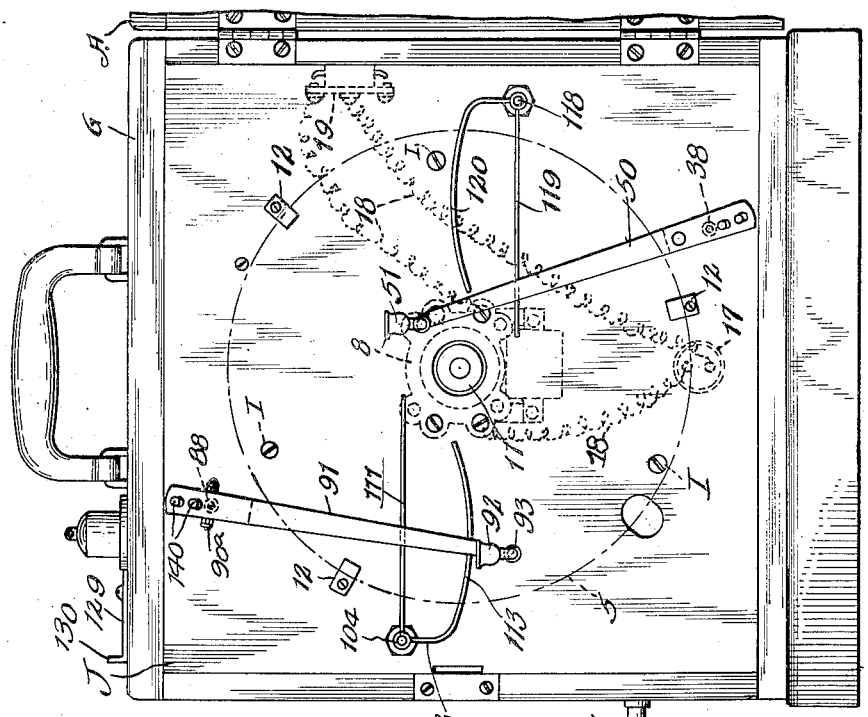

Jan. 9, 1940.　　　　T. BRADFORD　　　　2,186,517
APPARATUS AND METHOD FOR ASCERTAINING AND RECORDING
CONDITIONS OF THE CIRCULATORY SYSTEM
Filed Aug. 22, 1936　　　6 Sheets-Sheet 2
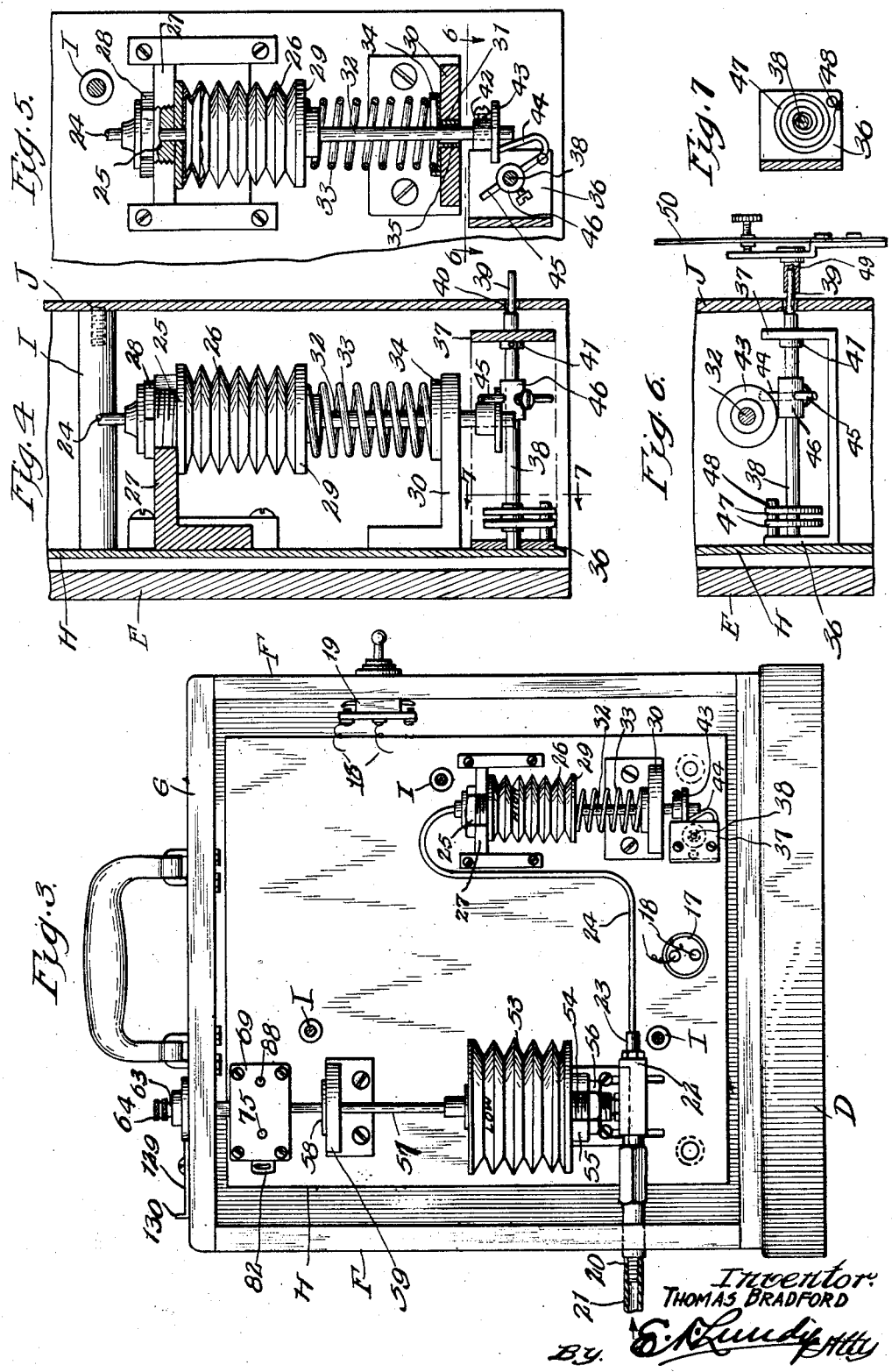
Inventor:
THOMAS BRADFORD

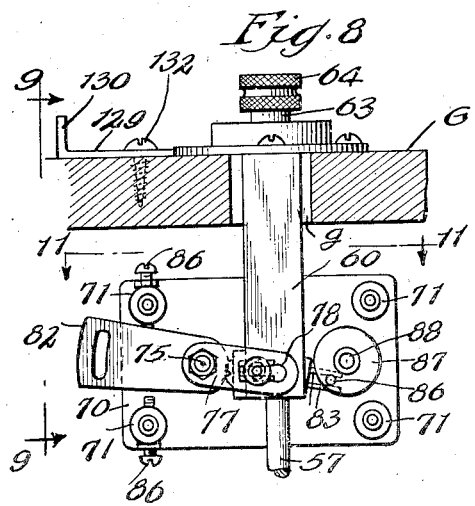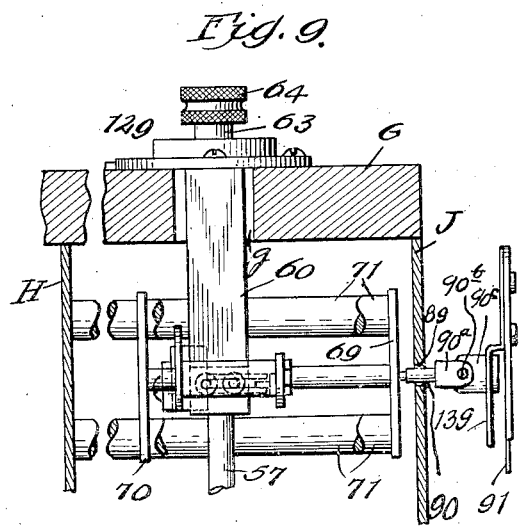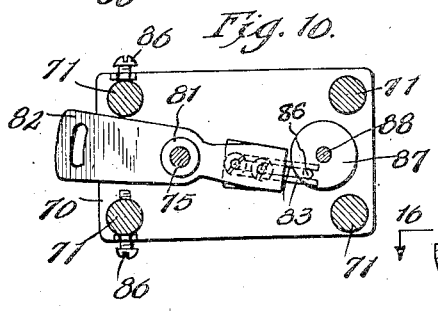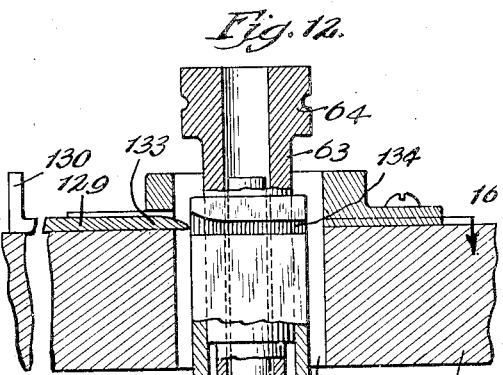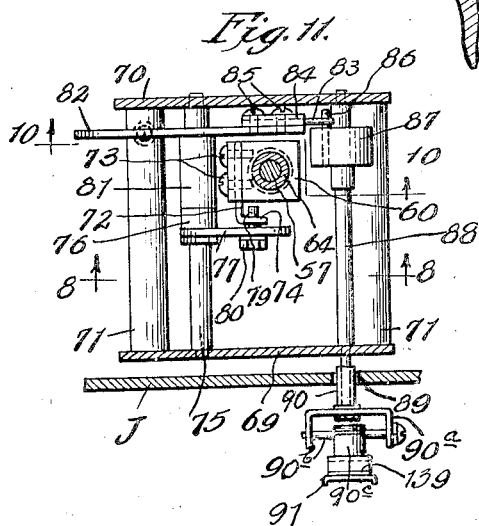

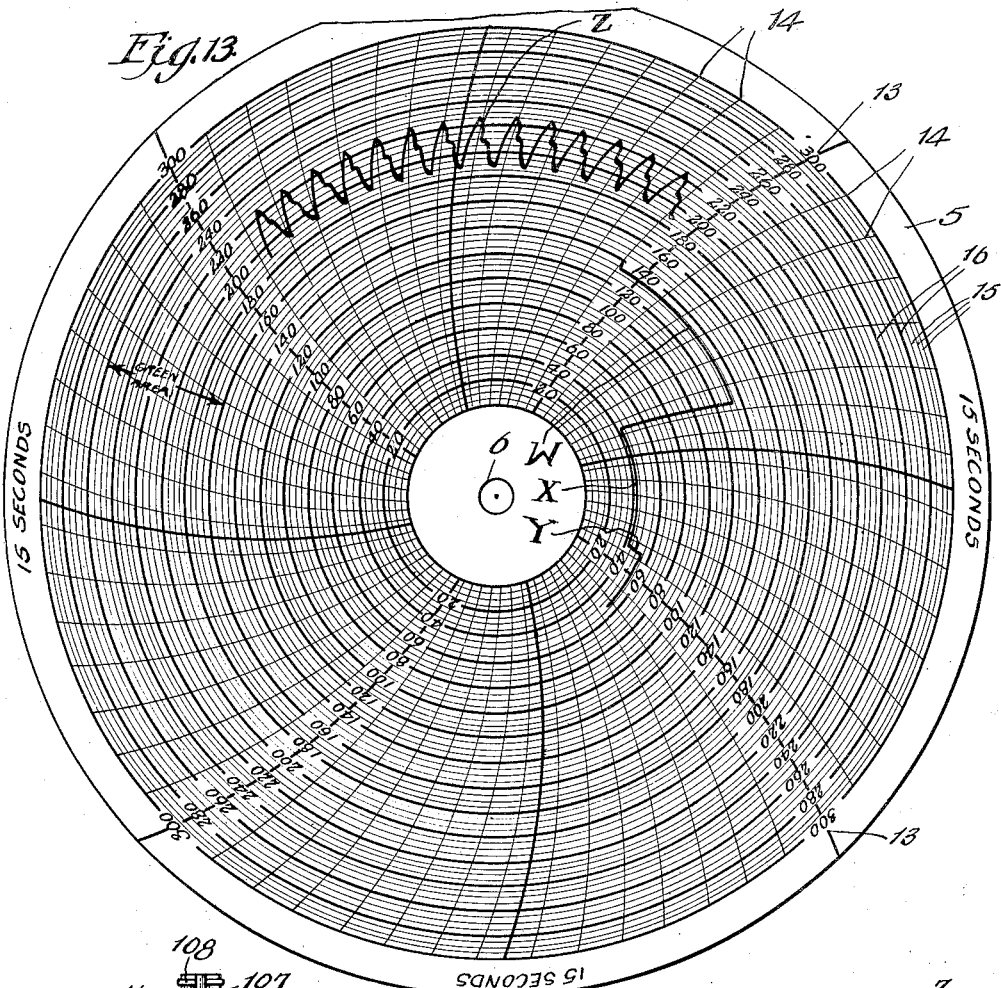
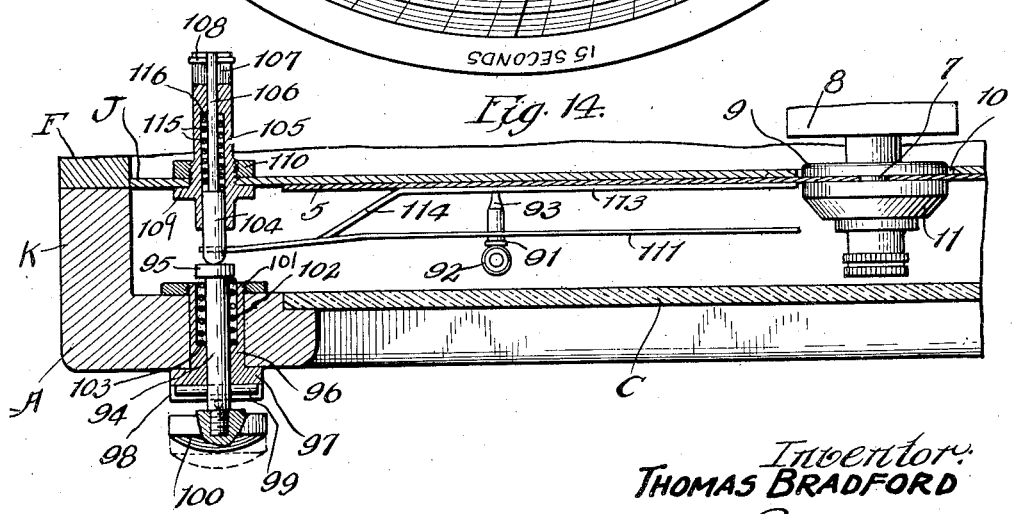

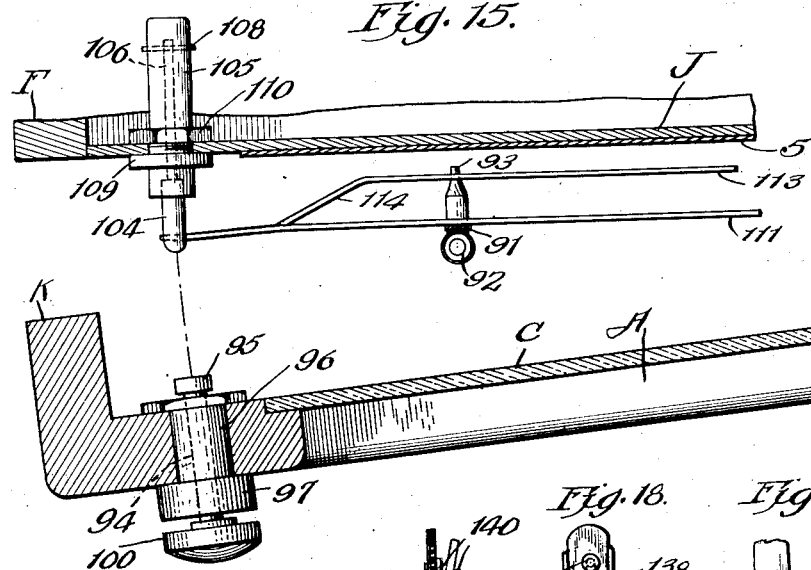
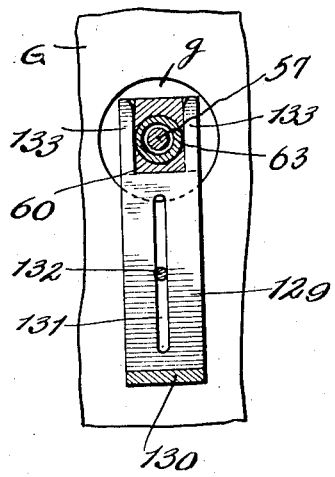
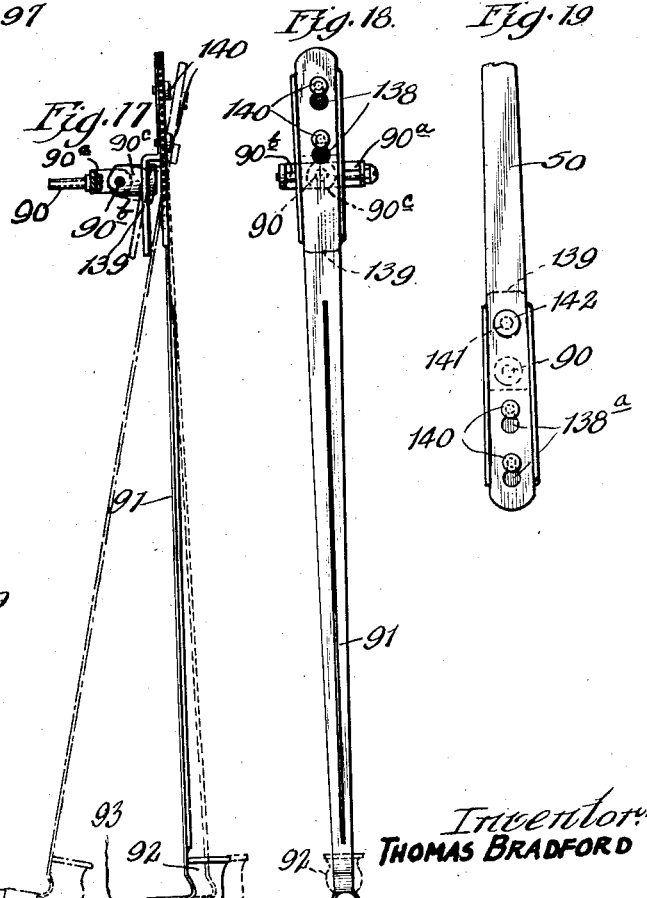

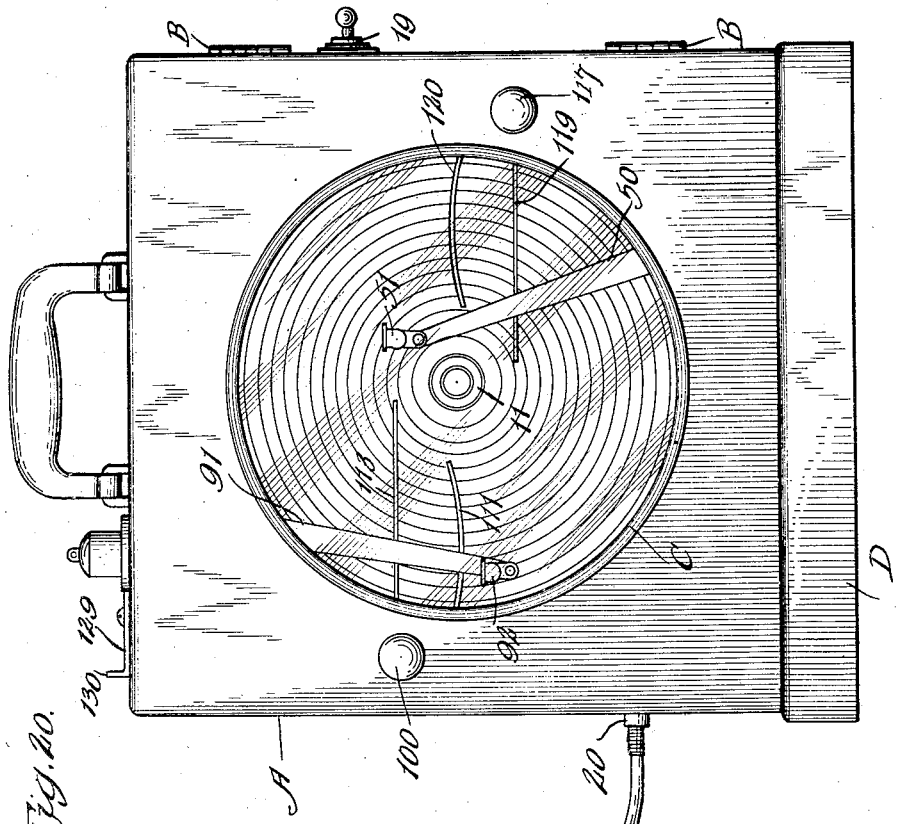

Patented Jan. 9, 1940

2,186,517

UNITED STATES PATENT OFFICE 2,186,517

APPARATUS AND METHOD FOR ASCERTAINING AND RECORDING CONDITIONS OF THE CIRCULATORY SYSTEM

Thomas Bradford, Chicago, Ill., assignor to William J. Cameron, Chicago, Ill.

Application August 22, 1936, Serial No. 97,396

13 Claims. (Cl. 128—2.05)

My invention relates to an apparatus for ascertaining the systolic and diastolic pressures of the human heart, also the rhythmic beat of the pulse, as well as the character of such pulsations. All these data, when ascertained, are graphically recorded upon a chart that is suitably scaled so that the person making the examination may accurately and quite readily note any and all abnormalities present thereon, with the result that a complete diagnosis of heart ailments of a particular patient may be made and the record thereof preserved for future reference.

Electrically operated apparatuses have heretofore been used for recording pulse beats, and certain well-known instruments are available for ascertaining blood pressure. The said electrically operated apparatus is quite complicated and it is inherently bulky so that it may not be readily transported from place to place by a physician or diagnostician. Furthermore, its structure is so delicate that it will not withstand transportation.

In the present apparatus I have combined all of the parts thereof in a small portable case that is light in weight and may therefore be readily carried by a physician or surgeon without inconvenience. In this apparatus I have provided a pair of independently operated styluses or inscribing pointers, one of which accurately records pressures and the other of which accurately and graphically delineates the pulsations made by the human heart and not only records the rapidity and rhythm of such beats, but also discloses the character thereof so that abnormalities will be disclosed. After the graphic delineation of the pulse beats and pressures have been made, the physician or surgeon will have for himself a complete analysis and record of the physical character of the patient which may be retained as a permanent record on which each characteristic or abnormality will clearly appear. So far as I am aware I am the first to produce a device or apparatus which will ascertain and record each and every action of the human heart it is desirable to ascertain and to simultaneously record the same.

I have also provided a novel and effective fountain stylographic pen for dependably recording the readings upon the chart or graph-sheet that is co-ordinated with the indicator or pointer. These pens are removably mounted on the indicators or pointers, and the latter embody novel constructions that permit them to be readily replaced on their mounting bracket and also to be very accurately adjusted with respect to the recording chart with which they are coordinated.

The principal object of my present invention is to provide an apparatus that is readily capable of operating in the manner herein set forth to accomplish the purposes for which it has been designed in an effective and dependable manner. Other objects are to provide an apparatus of this character that is novel in construction; dependable in operation; effective in performing its functions; sturdy in the formation and essemblage of the parts comprised in its make-up; easy to manipulate and operate; simple and sturdy in the formation of the parts so that it will not readily get out of order; and which is economical to manufacture so that it may be sold to the user for a reasonable retail price. Numerous other objects and advantages will be apparent to persons skilled in the art after the construction and operation of my apparatus is understood from the following disclosure.

I prefer to accomplish the numerous objects of my invention and to practice the same in substantially the manner hereinafter fully described and as more particularly pointed out in the appended claims. The accompanying drawings are referred to for better understanding of the construction and operation of my apparatus.

In the drawings:

Figure 1 is a front elevation of my apparatus enclosed in a carrying case with the door or front closed.

Figure 2 is an elevation similar to Figure 1 with the dor opened and looking at the false front plate or inscribing bed.

Figure 3 is a view showing the operating mechanism in elevation, looking at the same with the false front plate removed.

Figure 4 is a view showing details of the high pressure device of the apparatus in side elevation and slightly enlarged.

Figure 5 is a view of the structure shown in Figure 4 partly in section and looking at the front thereof.

Figure 6 is a horizontal section on line 6—6 of Figure 5, looking in a downward direction.

Figure 7 is a transverse section on line 7—7 of Figure 4, looking in the direction of the arrows.

Figure 8 is a detail view enlarged showing the leverage multiplying mechanism on the low pressure side of the apparatus, the view being on line 8—8 of Figure 11.

Figure 9 is a vertical elevation of said mechanism taken on line 9—9 of Figure 8.

Figure 10 is another view of said mechanism partly in section and taken on line 10—10 of Figure 11.

Figure 11 is a view taken on the plane of line 11—11 of Figure 8.

Figure 12 is a view in axial section of the adjusting clutch and spindle and enlarged.

Figure 13 is a plan of the chart.

Figure 14 is a horizontal section taken on line 14—14 of Figure 1 and drawn substantially full size.

Figure 15 is a view somewhat similar to Figure 14 showing the positions assumed by the parts when the door is opened.

Figure 16 is a horizontal section taken on line 16—16 of Figure 12 looking downward.

Figure 17 is a detail in side or edge elevation of the indicator or pointer on the pulsating side of the apparatus.

Figure 18 is front elevation of the pointer shown in Figure 17.

Figure 19 is a detail of the mounting and adjusting portion of the indicator or pointer on the high and low-pressure side of the apparatus.

Figure 20 is an illustration which graphically shows a manner of using my invention.

The drawings it will be understood are more or less schematic in character, and are for the purpose of disclosing a typical or preferred form in which my apparatus may be made. In these drawings like reference characters identify like parts wherever such parts appear in different views.

The mechanism and apparatus is housed within a suitable carrying case or cabinet of substantially rectangular shape which comprises a front A in the form of a door or closure that is mounted by hinges B upon the hollow body portion, and it is provided with a central circular opening closed by a glass panel C. Suitable latching mechanism is provided at the edges of the door and body opposite the hinges to releaseably retain the door in closed position. There is a base D, below the hinged door, which base provides the bottom or support for the body. The body consists of a vertical rectangular rear wall E, vertical side walls F, and a top wall G, the vertical walls being secured to and resting upon the base D. Suitably secured to the back wall E is a rectangular-shaped mounting plate H which forms a false back that is disposed in spaced relation to said back wall (Figs. 4 and 6), and suitable pillars or spacing studs I are secured to and project from this false back H for mounting the false front or bed J in desired relation thereto. As seen in Figures 4 and 14, the false front or bed J is flush with the forward edges of the top and side walls of the body or cabinet, while the door A is provided with lateral rearwardly extending flanges K along its edges that aline with and abut the forward edges of the top and side walls of the cabinet when the door is closed. Thus, a suitable shallow compartment or recess is provided between the false front plate J and the panel of the door for the accommodation of certain instrumentalities of my apparatus, and a closed compartment is provided between the plates H and J for the major portion of the apparatus.

The false front plate J provides a bed or platen upon which a record card or chart 5 is disposed, such card being preferably circular in outline and provided with a central aperture 6 to permit it to be removably mounted upon a rotatable spindle 7 that projects from an electric clockwork 8 mounted on the back of the plate or platen J. The clockwork is of any conventional construction except that the second-hand spindle 7 is arranged so that it rotates anti-clockwise. A wide flange 9 is anchored to the spindle 7 so as to be disposed in a large opening 10 in the central portion of the plate or platen J with the outer surfaces of said flange and said platen in the same plane, as shown in Figure 14. A flanged clamping nut 11 screws onto the protruding threaded portion of the spindle 7 and clamps the chart or card 5 between it and said flange 9 so that the card rotates with said spindle one revolution per minute. Suitable guides or clips 12 on the bed or platen J extend over the circumferential edge of the card or chart to assist in maintaining the same flat and smooth against the platen or bed plate J.

The card 5 which is of heavy paper or cardboard, is shown in detail in Figure 13, and is divided preferably into quadrants by radially curved heavy lines 13, each quadrant representing a time period of fifteen seconds, and these quadrants are subdivided by radially curved lighter lines 14 each representing one second of time. The chart rotates once during sixty seconds of time. Beginning at a central plain space the card is provided with a plurality of concentric lines 15 each fourth line 16 being heavier than the three intermediate lines and being identified by numbers designating 20 mm., 40 mm., 60 mm., etc., up to and including 300 mm. These heavy lines represent the scaling of twenty millimeters of pressure on a mercury column, while the light intermediate lines represent five millimeters of mercury column pressure. There is a zone between the 160 mm. and 260 mm. that is printed in a different color from the color of the other lines, the purpose of which will later herein appear.

The electric current for driving the clockwork 8 is led from a service outlet by an electric circuit cord which is removably coupled into a connector element 17 in the back wall of the cabinet that extends through the false rear or mounting wall H. Conductors 18 lead to the clockwork through a snap switch 19 on one of the side walls F where it is accessible and operable from the exterior of the case.

The inscribing pointers or arms for recording on the chart are moved by pressure-actuated or pressure-sensitive mechanisms. To this end a tubular stub 20 is mounted in one of the vertical side walls F of the case to removably receive the adjacent end of the flexible hose 21 leading to a source of pressure or pressure creating means. The inner end of this stub is connected to and communicates with the longitudinal bore of an elongated block 22, which, at its opposite end, is connected by a coupling 23 to a small tube or pipe 24 leading to and discharging into the upper head or closure member 25 of an elastic bellows 26. The head 25 of the bellows is exteriorly threaded and is screwed into a threaded aperture in a bracket arm 27 suitably mounted upon the false back H and projecting horizontally therefrom toward the front of the case. This head is securely anchored in position by a locking nut 28 that is screwed down on the upwardly protruding portion of the head. Below the bellows and spaced from its lower head or closure 29 is another horizontally disposed bracket arm 30 having a suitable guide opening 31 in it through which a vertically disposed rod 32 passes, the upper end of said rod being securely anchored to the bottom of the bellows or to its lower closure 29. A coiled expansion spring 33 surrounds and is spaced from the rod 32, and has its upper end engaged with the closure or head 29 of the bellows while its lower end is seated in a cup 34 resting upon the arm 30. The cup is provided with a central opening that is surrounded by a stub 35 that enters the guide opening 31 in the bracket arm 30 so that it is disposed between the walls of said opening and the rod 32 to provide a bearing for the rod and prevent dislodgement of the cup and spring. The rod, however, has slight lateral play in this guide bearing so that it may be freely moved up and down in a vertical direction with the vertical movements of the head 29 when the bellows expands or contracts.

Below the arm 30 there is a substantially U-shaped bearing bracket having one of its parallel arms 36 secured to the false back wall H while its other arm 37 is disposed a slight distance to the rear of the false front or platen J, as shown in detail in Figure 6. A small rocker shaft 38 is mounted horizontally in the arms 36 and 37 of this bracet so that it will freely rotate therein, and the outer end 39 of the shaft is reduced in diameter to pass through an aperture 40 in the alining portion of the false front or platen J. This horizontal rocker shaft 38 is prevented from longitudinal movement by a collar 41 that is adjustably secured to it back of the arm 37 and the axis of said rocker shaft is at a right angle to the axis of the rod 32 and bellows 26, but is disposed slightly laterally to such axis and out of alinement therewith. An adjustable collar 42 having a relatively wide flange 43 is secured to the adjacent portion of the rod 32 that projects below the bearing arm 30.

A substantially U-shaped rocking-element has its short arm 44 engaged at its end with the under face of the flange 43 and has its longer arm 45 extended through a sleeve 46 carried by and moved with the rocker shaft 38. This sleeve may be adjusted longitudinally and circumferentially upon the rocker shaft 38 and is locked in any position by suitable means. The long arm 45 of the U-shaped member passes through the sleeve, as shown in Figure 5, so that it may be adjusted longitudinally or rotatably therein after which it is locked in position. The two adjustments of the sleeve 46 and the two adjustments of the U-shaped rocking element permits the structure to be dependably and accurately calibrated for the purpose for which it is designed. The short arm 44 of the rocker element is maintained normally in contact with the flange 43 by means of several spiral hair springs 47 that have their inner ends connected to the rocker shaft 38 and their outer ends secured to a post 48 on the adjacent portion of the bracket arm 36.

The reduced end 39 of the rocker shaft which protrudes through the false front or platen J has the boss 49 of an inscribing pointer arm 50 frictionally mounted upon it. This arm is of thin light metal that yields under slight pressure and it extends upwardly, as shown in Figures 1 and 2 across a portion of the face of the card or chart and its free end is provided with a marking device such as a stylus or stylographic pen which is adapted to be engaged with the card or chart whenever it is desired to record any ascertained data. This marking device is of the fountain type and has a cup-like reservoir 51 to hold a flu'd which feeds a tubular stylus 52 having its open end in contact with the surface of the card or chart.

The structure hereinbefore described, which includes the pneumatic elements and associated devices, is what may be termed the high-pressure portion of this apparatus. There is also a low-pressure portion that is more or less associated with the preceding structure but operable more or less independently thereof although deriving its pressure from the same source. This second structure contemplates the use of a low-pressure bellows 53 the lower head of which has a threaded hollow stub 54 projecting from its central portion downward through the horizontal arm 55 of a bracket that is mounted on the false back or mounting plate H. This stub is held in position by a lock nut 56 and its bore communicates with the bore of the elongated block 22 through which the pressure fluid is supplied.

An elongated rod 57 is anchored to and extends vertically from the upper head of the low pressure bellows 53 to the top wall G of the case or cabinet where said rod enters an opening g (Fig. 12) in said wall, the diameter of said opening being ample to accommodate said rod without contact therewith. Intermediate its ends the rod passes loosely through a guide bushing 58 in a horizontal bracket arm 59 projecting laterally from the mounting plate H. Near the top wall G the rod 57 has an elongated block 60 adjustably secured to it by means of a clutch mechanism. The block is of rectangular shape in section as shown in Figure 11 and it is provided with a circular bore 61 that is reduced in diameter near its lower end to provide a conical seat 61ª for a bored fiber cone 62, surrounding the rod, which cone coacts with the seat to provide a friction clutch. An elongated tube 63 surrounds the rod 57 and extends above the block where it is provided with a finger-grasp or head 64 that is outside the cabinet where it may be manually operated. The lower portion of the tube is threaded to screw into threads 65 in the bore of the block above the seat, and between its lower end and the clutch cone 62 there is a relatively stiff expansion spring 66 that surrounds the rod between washers 67. It will be seen that by maintaining the block and rod in nonrotative position and then rotating the tube 63 by the hand grasp 64, the lower end edge of the tube will compress the spring 66 and force the cone 62 into its seat 61ª to frictionally lock the block and rod together. Reverse rotation of the tube 63 relieves pressure on the spring 66 and releases the clutch parts. The cone 62 is slitted longitudinally and in order to insure the release of the cone the latter has a split spring ring 62ª, of the contraction type, imbedded in it to insure release of the cone from its seat.

The rod 57 when clutched to block 60, and through the medium of associated instrumentalities, is operatively connected to an inscribing pointer arm which extends across a portion of the face of the movable card or chart to record thereon all characteristics of the pulsating pressure which actuates the pressure sensitive element or bellows 53. The associated instrumentalities are constructed and arranged in such a manner that even very slight pulsations of the pressure are amplified in order that a graphic delineation of such plusations and all abnormalities thereof are accurately recorded upon the chart for permanent reference. The instrumentalities which accomplish this amplification of the pulsations are preferably in the shape of a plurality of interengaged rocker-arms, rock-shafts and the like and are shown in details in Figures 8 to 11 to which reference is now made. These parts are mounted in a suitable frame that consists of rectangular shaped vertical plates 69 and 70 that are spaced horizontally from each other and are supported from the false back wall H by a plurality of posts 71 that project laterally from said back wall and engage the corners of said plates, and, as seen in Figure 11, the rod 57 and its clutch, are disposed vertically within or pass through this frame.

One vertical side of the clutch block has the longer arm portion 72 of an L-shaped fork adjustably secured to it by set screws 73, and the laterally disposed bifurcated portion 74 of the work is disposed alongside the face of the block 60 at a right angle to the block face on which the portion 72 of the fork is mounted so that by loosening the clamp the bifurcated ends 74 may be adjusted towards or from the adjacent face of the block. A horizontal rocker shaft 75 is journaled in the vertical plates 69—70 of the frame, the ends of the shaft being reduced in diameter to provide trunnions which prevent end-thrust or longitudinal movement of the shaft in its bearings. Intermediate its ends the rocker shaft has a small collar 76 secured to it, and a short lever arm 77 anchored to this collar projects laterally from the shaft so that its free end is positioned alongside the adjacent bifurcated end portion 74 of the fork that is carried by the clutch block, and said lever arm 77 is provided with a longitudinally elongated slot 78 in which a laterally projecting element in the form of a pin 79 is adjustably mounted. This pin 79 is of sufficient length to project into the bifurcation 74 of the fork, and it may be adjusted longitudinally in the slot 78 and then held in position by a lock nut 80 that is screwed onto its threaded end which protrudes from the opposite side of the arm from the fork. Up and down movements of the rod 57 will oscillate the lever arm 77 and such movement is of course transmitted to the rocker-shaft to which said arm is secured.

To the rear of collar 76 there is another collar 81 secured to the rocker shaft 75 and which terminates near the rear plate 70 of the frame where it has the central portion of an elongated rocker lever arm 82 secured to it, the outer (left-hand) portion of said lever arm projecting between the adjacent posts 71 of the frame and the inner (right-hand) portion of said lever arm extends past the rear of the block 60 between the latter and the rear plate 70 of the frame. The inner end portion of lever arm 82 has a fork or bifurcation in the form of two parallel wires 83 that are adjustable longitudinally in a clamping plate 84 and maintained in position by the heads of small screws 85 the shanks of which are threaded into tapped holes in the adjacent portion of the lever arm 82. The oscillations of this arm 82 are limited by adjustable set-screws 86 that pass transversely through the upper and lower left-hand posts 71 of the frame in alinement with the outer or left-hand portion of the lever arm. By adjusting these set-screws the respective up and down movements of the arm 82 are definitely determined, and, since the other instrumentalities mounted in the frame connect this lever-arm 82 to the vertical rod 57 and low pressure bellows 53 these latter elements are correspondingly and proportionately limited in movement.

The fork or bifurcation 83 is engaged with an eccentric or cam-pin 86 that projects from the adjacent face of a cam wheel or cylinder 87 that is anchored to a rocker shaft 88. This rocker-shaft is disposed upon a horizontal axis that is parallel to and in substantially the same horizontal plane as the above-mentioned rocker shaft 75 and it has its ends reduced in diameter to provide trunnions that are journaled in bearings in the frame plates 69—70 and prevent longitudinal movement of said rocker-shaft. The trunnion at the front frame plate 69 is elongated to pass through an aperture 89 in the false front wall J (Figs. 9 and 11) where it frictionally enters the tubular boss 90 of an inscribing pointer arm 91. Said arm 91 is of light thin metal so that it readily yields under pressure and it extends downwardly, as shown in Figures 1 and 2, across a portion of the face of the card or chart. The free end of the pointer 91 carries a suitable marking device or stylographic pen of the fountain type that may be engaged with the surface of the card or chart whenever ascertained data are to be recorded. This marking device is similar to the one carried by the pointer arm 50 and consists of a cup or reservoir 92 from which the fluid is fed to a tubular stylus 93 that has its open end disposed laterally to the chart and adapted to contact the latter whenever desired.

It is desirable, when the apparatus is not in use, to maintain the inscribing pointer arms 50 and 91 in positions that hold the respective styluses out of contact with the chart 5 or the false front J if the chart has been removed. Furthermore, during operation of the apparatus, only one pointer arm may be used at a time while the other arm remains idle as when the high and low pressures are being recorded by pointer 50. This may be readily accomplished by the simple operation of a novel structure that is adapted to hold either or both of the arms away from the chart, and when one of the arms is being used, this structure is provided with means that engages the chart and urges it flat and smooth against its platen (false front wall J). The structure in question is duplicated for each pointer with the exception that the control fingers project in opposite directions as seen in Figures 1 and 2. Details of one of the structures is shown in Figure 14 wherein it will be seen a yieldable plunger 94 having a head 95 on its inner end is reciprocably mounted in a spool-shaped bushing 96 in the body of the door about midway its height and alongside the glass panel C of the door. The outer end of the bushing has a circular flange 97 that engages the outer surface of the door and is provided with a radial groove 98 to seat a cross-pin 99 that passes transversely through the adjacent portion of the plunger 94, while the outer end of said plunger is provided with a finger-grasp or handle 100 for manually operating the plunger. The inner end of the bushing 96 is threaded exteriorly to receive a threaded clamp nut or annulus 101 which when tightened thereon holds the bushing in a solid manner. The inner portion of the bore of the bushing is enlarged to accommodate a coiled expansion spring 102 that surrounds the shank of the plunger between its head 95 and the shoulder 103 formed by increasing the bore, and said head is of smaller diameter than the enlarged bore so that said head will be retracted into the same whenever the plunger is pulled in an outward direction. The plunger may be maintained in this latter position by slightly rotating the hand grasp 100 to dispose the cross-pin 99 across the channel or groove 98, the purpose of which will later appear herein.

Normally opposing the plunger head 95 is a yieldable follower 104 that protrudes from the outer end of a bearing sleeve 105 mounted transversely in the false front J. The bore of sleeve 105 is reduced to receive and guide the elongated axial spindle 106 of the follower and there is a longitudinal slot 107 in the end of the sleeve to guide the follower stop which is in the form of a small cross-pin 108 extended transversely through the end of spindle 106. The sleeve has an annular flange 109 that provides an abutment which engages the outer face of the false front J when a clamp nut 110 is tightened against the rear face of the false front by being turned on the threaded inner portion of the sleeve 105. A coiled expansion spring 115 surrounds the spindle 106 between the inner end of the follower 104 and the shoulder 116 formed by reducing the bore of the sleeve 105, so that the follower normally is urged toward the outer limit of its movement that is controlled by the stop pin 108 in the slot 107.

Means are carried by the follower 104 for lifting the pointer arm from the chart whenever desired and for maintaining the chart flat against the platen J (false-front) during inscribing action of the pointer arm. This structure consists of a length of wire 111 that has one end secured to the follower 104 and its free end projects therefrom across the adjacent portion of the chart parallel thereto and in substantially a horizontal plane so that the intermediate portion of the wire is back of the pointer arm (Fig. 14). Another length of wire has one end anchored to the follower 104 and is of irregular shape. This latter wire has a vertical portion 112 extended down from the follower and then extends in a substantially horizontal curved or bowed portion 113, and between these portions there is an off-set obliquely bent portion 114 that extends towards the chart or platen. Thus the main bowed portion 113 of the wire is positioned so that it will rest flat against the outer surface of the chart and press the latter against its platen while permitting the chart to be rotated as hereinbefore described when making a record. The head 95 of the plunger normally presses against the adjacent protruding end of the follower 104 and the tension of spring 102 is sufficient to overcome the tension of the follower spring 115. The plunger 94 and its mounting structure are supported by the swinging door, so that when the door is opened the pressure opposing the follower is released and it will move outward to its limit thereby carrying with it the two wires that coact with the chart and the pointer arm and move the pointer arm free of the chart as shown in Figure 15. When the door is closed the plunger causes the follower to retract and the wires return to their original positions. Whenever a pointer arm is not to be operated the plunger hand grasp 100 is pulled outward until the cross pin 99 leaves its groove whereupon the parts are rotated to position the pin transverse to its groove thus retracting the plunger head 95 into the bore of its sleeve so that the follower is free to move to its outer limit of movement and thus the wire 111 holds the pointer arm and its stylus away from the chart. A structure similar to that above described is provided for the pointer arm 50 of which only a portion is shown. The parts thus illustrated are the hand grasp 117, the follower 118, the straight wire 119 that engages the pointer arm 50, and the irregular shaped curved wire 120 that engages the adjacent portion of the chart. When systolic and diastolic pressures are being taken and recorded by pointer 50 the hand-grasp 117 is in an inward position causing retraction of the opposing follower 118 so that the stylus 51 will engage the graph-sheet. At this time the other hand-grasp 100 is pulled out and held by its cross-pin 99 permitting its opposing follower 103 to be projected so that the wire arm 111 lifts the pointer 91 and its stylus 93 away from the graph-sheet into a non-recording position. The high and low pressures may then be taken and recorded by pointer 50. When pulse-beats are being recorded both the hand-grasps are in their inward positions so that both the pointers are acting upon the sheet and thus the pointer 91 records the pulsations while the pointer 50 records the pressure at which the pulse beats are recorded. When the apparatus is not in use and door A is closed the pointers are maintained in non-operative positions by pulling out both hand-grasps to be held by their cross-pins and the wire arms 111 and 119 will move the pointers away from the sheet and maintain them thus until a recording is to be made.

The pressure creating means which supplies the pressure to the bellows 26 and 53 is a surgical arm band or sleeve similar to that used by physicians and surgeons in ascertaining blood pressures of a patient. This structure which is graphically illustrated in Figure 20 consists of an elastic air bag 121 of rubber or the like enclosed in a cloth pocket having an elongated band 122 that is wrapped several turns around the person's arm above the elbow and then secured in place by tying or otherwise. The flexible hose 21 establishes communication between the air bag and stub 20 of the apparatus, and another flexible hose 123 leads from the air bag to a pressure-creating bulb 124 of the hand-operated collapsible type having an adjustable control valve 125.

When it is desired to create pressure within the conduit and the pressure sensitive elements 26 and 53, the attendant, after placing the arm band or sleeve upon the patient's upper-arm adjacent the elbow, proceeds to pump air into the elastic air bag 121 by means of the bulb, the air control valve 125 for discharging air out of the system being closed. In this connection it will be understood that the air is sucked into the bulb through a valve controlled inlet port 126 in its end which admits the air but the air cannot be discharged therethrough. The attendant, by means of the diaphragm element 127 of a stethoscope 128 properly placed against the brachial artery just below the arm band, will listen to pulsations thereof until the arm band has been tightened against the artery to the critical point or where pulsations of the brachial artery are not discernible with the stethoscope. At this time the systolic pressure or point of high blood presure will have been reached. Prior to creating pressure in the two bellows the hand grasps 100 and 117 controlling the pointer arms are pulled outwardly and set so as to allow the plungers to release their respective followers, which in turn move outwardly in their sleeves and cause the arms 111 and 119 to move away from the chart carrying with them the stylus portion of the pointer arms 91 and 50. The switch 19 for operating the clock motor 8 has also been turned off in order that most of the operative parts of the apparatus are inert. The pointer arm 50, however, will have been moved by expansion of the high pressure bellows 26 to a location to indicate on the chart the amount of the systolic pressure. The free end of the pointer is then released by returning the hand grasp 117 and its coacting plunger to normal position which causes the stylus or pen 52 of the pointer arm to engage the chart at or between one of the concentric lines 15—16 where the systolic pressure in millimeters may then be recorded. To do this the electric switch 19 is turned on and the clock motor rotates the chart a slight distance so that a distinct score line is made which is of sufficient length for ready reading. The clock work is now stopped by throwing off the electric switch 19 bringing the chart to rest.

The attendant then releases the valve 126 of the bulb thus allowing the air bag 121 to partially deflate and by use of the stethoscope 128 he notes the pulsations or actions of the heart muscles until the pressure in the pneumatic system has been lowered to a point where there is a cessation of the pulsations, known as the critical point of diastolic pressure. During this reduction in pressure the pointer arm will move toward the center of the chart due to the partial collapsing of its operating bellows 26. The valve 125 is closed immediately upon noting the critical point of diastolic pressure and the chart is again rotated a slight distance so that the stylus on the end of pointer arm 50 records the diastolic or low pressure upon the chart. During these two movements of the chart the other pointer arm 91 has been rendered ineffective upon the chart and no recording has been made by it.

The next or third step in the use of the apparatus is to note and record the regularity or irregularity of the pulse beat, the rapidity thereof, and any abnormalities in the cardiac and circulatory systems which may be present in the particular patient. This is accomplished by increasing the pressure in the air bag approximately 10 to 15 mm. above the low-pressure reading by operating the bulb 24. This increase in pressure will be noted by a lateral score or mark on the chart by the arm 50, which mark will extend to the right or radially away from the line indicating diastolic or low pressure. The pointer arm 50 remains in its recording position and the pointer arm 91 is released and its stylus 93 placed in contact with the chart. The chart is again rotated and the pulsating pressure from the air bag is transmitted to the more sensitive low pressure bellows 53 which causes oscillations of the left pointer arm 91. Each oscillation of the pointer arm is recorded by its stylus 93, and, since the clock-work, operating on a 60-cycle current rotates the clockwork one complete revolution each minute, the number of pulse beats for a given fraction of a minute may be read upon the chart and the character of the undulations therein, due to any abnormalities of the heart will be accurately recorded by the stylus of the pointer arm 91. During this step of operation the pointer continues to inscribe on the chart the pressure at which the pulsations are being recorded.

During the ascertaining and recording of the high and low pressures, as well as the operation of increasing the low pressure 10-15 mm. the spindle 57 of the more sensitive low-pressure bellows 58 has been disconnected from the lever system by releasing the yieldable clutch element 62 in the bore of the elongated block 60. When it is desired to connect these parts the head 64 of the tube 63, is rotated to expand the clutch element 62 and lock the block 60, which carries the operating fork elements 72, to the rod 57. Since these parts are quite sensitive, suitable means are providing for holding the block in a rigid manner while the tube is being rotated. These means consist of an elongated slide 129 having an upstanding lip 130 by which it may be operated and which has an elongated longitudinal slot 131 to receive a headed guide-pin or screw 132 that it is screwed into the top wall G of the cabinet adjacent the guide opening g. The end of the slide 129 opposite the lip is provided with parallel fingers 133 that are adapted to be projected across the opening g and enter transverse horizontal grooves 134 in the adjacent upper end of the elongated block 60. As seen in Figure 12 the initially engaged portions of the fingers 133 and the grooves 134 are tapered or slightly oblique to their main portions in order to permit ready entrance of said fingers into the ends of said grooves. When the slide is projected in the manner shown in Figure 12 the block is maintained against up and down movement as well as rotative movement and the lever system which connects the block to the rocker shaft 88 carrying the pointer arm 91 will have been positioned so that the stylus end of the pointer arm will be in the zone of contrasting color (preferably green) on the chart. After the clutch has been tightened the slide is retracted or withdrawn from the upper end of the elongated block 60, as shown in Figure 12. The block 60 and the rod 57 are maintained against rotative movement with respect to each other by forming an elongated groove 135 extending longitudinally in the rod, which groove is engaged by a guide pin or screw 136 threaded transversely into the lower end portion of the block.

The pointers 50 and 91 on account of the delicate function they are required to perform are made from very thin yieldable metal that is light in weight, and therefore quite fragile, and it is obvious that these pointers are liable to become distorted in use or in handling and therefore require adjustment or replacement. Hence I have provided a device of novel construction for the purpose indicated, such device being shown in detail in Figures 17, 18 and 19. The structure shown in Figure 17 is the pointer used on the end of rock-spindle 88 for indicating and recording actions of the low pressure bellows 53 that is used for pulsating pressures. The pointer 91 is an elongated narrow strip of thin metal that is provided upon its lower or work end with a cylindrical pocket 137 that is disposed laterally to the body of the pointer to receive the tubular stylus 93, and on its upper or mounting end the pointer is provided with two or more upwardly tapered key-holes 138. The tubular boss 91 (which coacts with the end of rock-spindle 88) carries a relatively wide gimbal or yoke 90ª having a rock-pin 90ᵇ journaled in its arms and intermediate its ends said pin has a cylindrical block or head 90ᶜ secured to it. An off-set or Z-shaped carrier 139 is secured to the outer end of said head and the upper arm of this carrier has two headed pins 140 mounted on it with their heads spaced a slight distance from the adjacent arm. The heads of the pins are of a size to pass through the wide portions of the keyholes 138 of the pointer so that the latter may then be moved downward to engage the shanks in the narrower portions of the key-holes. The rock pin 90ᵇ acts as a hinge and the weight is to one side thereof as seen in Figure 17 so that the tendency of the lower end of the pointer 91 is to swing inward towards the chart 5, which tendency is sufficient to cause the pen-point 93 to contact the chart with proper friction to inscribe the record thereon. The mounting carrier for the other pointer 50 (Fig. 19), that indicates and records systolic and diastolic pressures, is similar to the structure above described with the exception that the gimbal, rock-pin and block are omitted, and the carrier plate 139 is secured direct to the tubular boss 49. The headed pins 140 are on the lower arm of the carrier and the key-holes 138a taper towards the work end of this pointer. There is a threaded boss 141 on this pointer to receive the shank of adjusting screw 142 the end of which abuts the adjacent surface of the carrier so that turning the set screw adjusts the pointer laterally to the chart 5.

The record of a typical examination has been made by means of heavy black lines on the chart shown in Figure 13, which lines are identified as follows:—W represents systolic or high blood pressure; X represents diastolic or low blood pressure; Y represents the increase of 10–15 mm. pressure for recording the pulse; and Z, which is recorded in the green zone, shows the undulations of the heart beat, the rapidity of the pulse and abnormalities in the surge caused by the heart valves and muscles.

What I claim is:

1. Apparatus of the kind described comprising a pressure-responsive device, a rod connected to and reciprocated by said device, a pointer, a lever mechanism having operative connection with and adapted to actuate said pointer, and a manually operated clutch structure having a member adapted to be clamped to and form a positive connection with said rod, said clutch adapted to be operated to release said member from said rod, said clutch structure also having another member that is operatively connected with and actuates one of the elements of said lever mechanism.

2. Apparatus of the kind described comprising a pressure-responsive device, a pointer adapted to indicate movement of said device, a rod secured to and extending from said device, a lever mechanism adapted to transmit movement of said rod to said pointer, and means for operatively connecting and disconnecting said lever mechanism to said rod, said means embodying an elongated annular member into which said rod extends and having a clutch-seat in its bore, a tube surrounding a portion of the rod within said annular member and manually adjustable longitudinally with respect thereto, and a clutch element normally loosely disposed around said rod adjacent the end of said tube and adapted to be operated by said tube to frictionally engage said seat and said rod.

3. Apparatus of the kind described comprising a pressure-responsive device, a pointer adapted to indicate movement of said device, a rod secured to and extending from said device, a lever mechanism adapted to transmit movement of said rod to said pointer, and means for operatively connecting and disconnecting said lever mechanism to said rod, said means embodying an elongated annular member into which said rod extends and having a cone-shaped clutch seat in its bore, a tube surrounding a portion of the rod within said annular member and manually adjustable longitudinally with respect thereto, and a cone-shaped clutch element normally loosely disposed around said rod adjacent the end of said tube and adapted to be operated by said tube to frictionally engage said cone-shaped seat and said rod.

4. Apparatus of the kind described comprising a pressure-responsive device, a pointer adapted to indicate movement of said device, a rod secured to and extending from said device, a lever mechanism adapted to transmit movement of said rod to said pointer, and means for operatively connecting and disconnecting said lever mechanism to said rod, said means embodying an elongated annular member into which said rod extends and having a clutch-seat in its bore and a threaded portion adjacent said seat, a manually operable tube surrounding a portion of said rod within said annular member and having threads cooperating with the threaded portion of said annular member, and a clutch-element positioned in said clutch-seat and actuated by said tube to frictionally clamp said rod to said annular member.

5. Apparatus of the kind described comprising a pressure-responsive device, a rod connected to and reciprocated by said device, a pointer, a lever mechanism having operative connection with and adapted to actuate said pointer, and means adapted to operatively connect and disconnect said lever mechanism to said rod, said means embodying an annular member into the bore of which said rod extends and which member is provided with a clutch-seat in its bore and threads adjacent said seat, a manually operated threaded tube screwed into the bore of said annular member and having a portion projecting out of the same, a clutch element in said clutch-seat and surrounding said rod, and yieldable means interposed between said clutch element and the adjacent end of said tube.

6. Apparatus of the kind described comprising a pressure responsive device and means for supplying pressure thereto, a pointer adapted for indicating movements of said pressure-responsive device, a chart operated on by said pointer a lever mechanism actuated by said pressure-responsive device and embodying a rock-spindle, a gimbal disposed substantially horizontal on said rock-spindle, a rock-pin journaled in the arms of said gimbal, and means connecting said pointer to said rock-pin to hang pendent thereon and over-balanced to urge the lower portion of said pointer toward said chart.

7. Apparatus of the kind described comprising a sensitive device affected by high-pressures, a second sensitive device affected by low-pressures and separate from said first device, means embodying a closed conduit in which a variety of pressures are produced, the said means being common to both said sensitive devices and separately communicating therewith, separate pointer-arms operatively connected with and actuated by the said respective sensitive devices, a mobile graph-sheet common to the indicating portions of said pointer-arms, and means for rendering one pointer-arm ineffective with respect to said graph-sheet during operation of the other pointer-arm on said graph-sheet.

8. Apparatus of the kind described comprising a high-pressure sensitive device, a low-pressure sensitive device, means for producing a variety of pressures, said means embodying a normally closed conduit that is common to and separately communicates with both of said sensitive devices, separate pointer-arms actuated respectively by said sensitive devices, a mobile graph-sheet common to said pointer-arms, and means for selectively rendering said pointer-arms separately operative on said graph-sheet.

9. Apparatus of the kind described comprising a pressure-responsive device, a rod connected to and reciprocated by said device, a pointer, and mechanism operatively connecting said rod and pointer, said means embodying a rock-spindle to which said pointer is secured, a second rock-spindle, rocker-arms on said second spindle one of which said arms has operative connection with said first-mentioned rock-spindle, and a clutch having a member adapted to be clamped to said reciprocal rod, the other of said rocker-arms having operative connection with said clutch member, whereby movement of said pressure-responsive device is transmitted to said pointer.

10. Apparatus of the kind described comprising a pointer, a rock-spindle carrying said pointer, a crank-pin supported and actuated by said spindle, a rocker-shaft adjacent said spindle, a reciprocable rod adjacent said shaft, pressure-responsive means for actuating said rod, a clutch mechanism embodying a member adapted to be clamped to said rod, a lateral pin on a member of said clutch, spaced rocker-arms mounted on said shaft, a fork on one of said arms engaged with said crank-pin, and a fork on the other arm engaged with the lateral pin on the clutch member, whereby movement of said pressure-responsive means is transmitted to said pointer.

11. Apparatus of the kind described comprising means including a closed conduit in which pulsating and non-pulsating pressures are produced, a pneumatic bellows communicating with said conduit and affected by pressures therein, a plurality of levers operatively connected to each other, a manually operated clutch structure providing ready connection and disconnection between one of levers and said bellows, a pointer arm actuated by one of said levers, a mobile graph-sheet co-operating with the indicating portion of said arm, and means for rendering said arm ineffective with respect to said sheet during non-pulsating pressures.

12. Apparatus of the kind described comprising means including a closed conduit in which pulsating and non-pulsating pressures are produced, a pneumatic bellows communicating with said conduit and affected by pressures therein, a plurality of levers connected to each other, a manually operated clutch structure providing ready connection and disconnection between one of levers and said bellows, a pointer arm actuated by one of said levers, a rotatable graph-sheet co-operating with the free end of said arm, means for rotating said graph-sheet, and means for rendering said arm ineffective with respect to said sheet during non-pulsating pressures.

13. Apparatus of the kind described comprising means including a closed conduit in which pulsating and non-pulsating pressures are produced, a pneumatic bellows communicating with said conduit and affected by pressures therein, a plurality of co-acting levers connected to each other, a manually operated clutch structure providing ready connection and disconnection between one of levers and said bellows, a pointer arm actuated by one of said levers, a rotatable graph-sheet co-operating with the free end of said arm, means for rotating and timing said sheet, and means for rendering said arm ineffective with respect to said graph-sheet.

THOMAS BRADFORD.